W. V. TURNER.
EMPTY AND LOAD BRAKE.
APPLICATION FILED APR. 18, 1916.

1,256,617.

Patented Feb. 19, 1918.
2 SHEETS—SHEET 2.

INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

EMPTY AND LOAD BRAKE.

1,256,617.

Specification of Letters Patent.  Patented Feb. 19, 1918.

Application filed April 18, 1916.  Serial No. 91,846.

*To all whom it may concern:*

Be it known that I, WALTER V. TURNER, a citizen of the United States, residing at Wilkinsburg, in the county of Allegheny and State of Pennsylvania, have invented new and useful Improvements in Empty and Load Brakes, of which the following is a specification.

This invention relates to fluid pressure brakes, and more particularly to an empty and load brake apparatus.

Railway cars have heretofore been equipped with empty and load brakes, but in order to set the apparatus for load braking or empty car braking, it has been necessary for the operator to manually adjust the apparatus on each vehicle as required.

This consumes time as well as requires labor and the principal object of my invention therefore contemplates doing away with the manual adjustment on each vehicle by providing means for adjusting the load brake apparatus on the cars from the locomotive.

Figure 1:
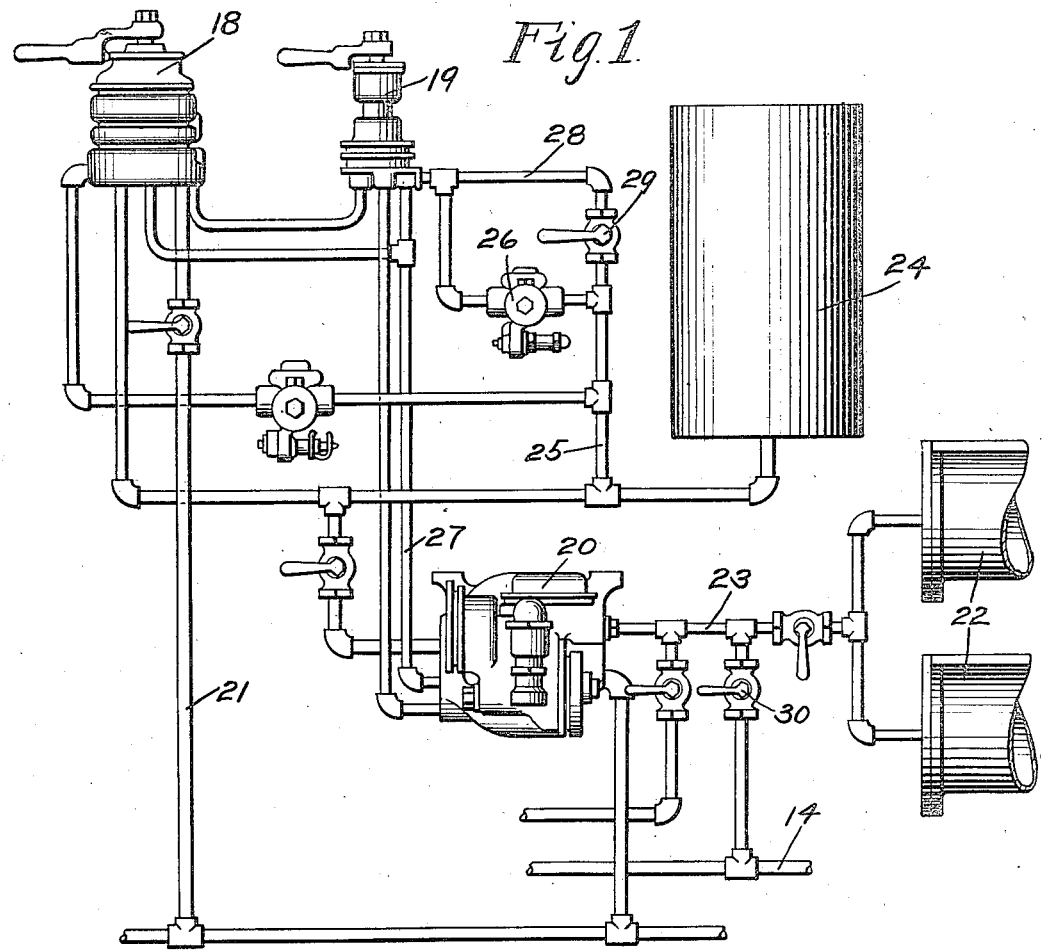
Figure 2:
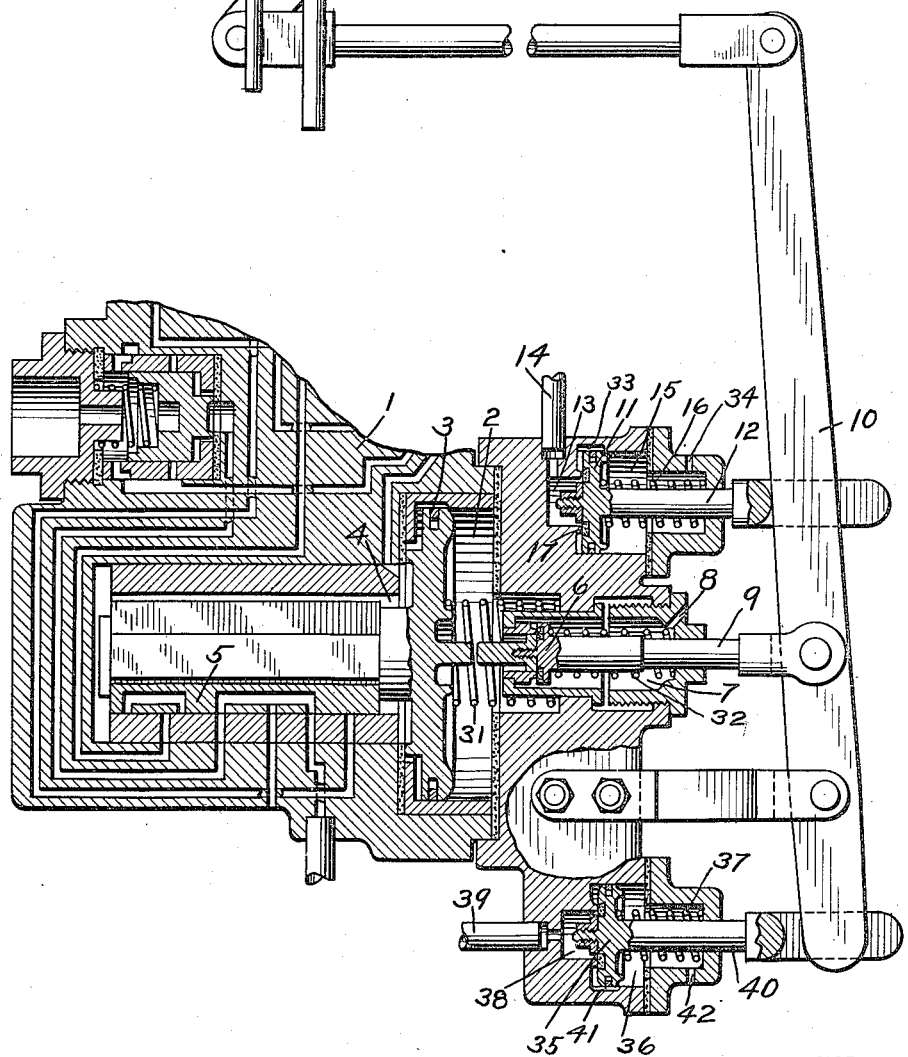

In the accompanying drawings; Figure 1 is a diagrammatic view of a locomotive brake equipment embodying my invention; and Fig. 2 a sectional view of a portion of an empty and load brake apparatus for a car embodying my improvements.

My invention contemplates applying a fluid operated piston device to the empty and load brake apparatus on the car for pneumatically operating the manually controlled means employed for adjusting the load brake apparatus according as the cars are empty or loaded, and in order to operate said piston device, a manually operated valve on the locomotive, such as the brake valve, is employed for supplying and releasing fluid under pressure through a train pipe to and from the piston device.

In the drawings, one application of my invention is shown in which an empty and load brake apparatus similar to that covered by my prior Patent No. 1,131,967, dated March 16, 1915, is provided and in which the locomotive brake equipment corresponds with that shown in my prior Patent, No. 1,109,715, dated September 8, 1914.

According to the construction shown and described in the above mentioned Patent No. 1,131,967, a casing 1 is provided, having a piston chamber 2, containing a piston 3, and a valve chamber 4 containing a slide valve 5 adapted to be operated by the piston 3 for adjusting the load brake apparatus for empty car braking when in one position and for adjusting same for loaded cars when in another position. It being understood that the piston 3 and slide valve 5 operate to effect the shifting of the load brake apparatus for empty or loaded car braking, it is not deemed necessary to further describe how this is accomplished, since the present invention is concerned only with the shifting of the piston 3.

For effecting the operation of piston 3, a valve 6 is provided for controlling the venting of fluid from piston chamber 2 to a spring chamber 7 which has an atmospheric vent port 8.

The valve 6 is carried by a stem 9 which is connected to a lever 10 through which the valve can be manually adjusted either to its open or its closed position.

According to my present invention, in addition to the means for manually operating the valve 6, a piston 11 is provided, having a stem 12 with a forked end adapted to engage the lever 10 for moving same in one direction, but so arranged as to permit the free movement of the lever by the usual manual operation.

The chamber 13 at one side of piston 11 is connected to a train pipe 14 leading to the locomotive and chamber 15 at the opposite side contains a coil spring 16 which acts on piston 11 and tends to maintain same on a seat 17.

The locomotive brake equipment, as shown in Fig. 1 of the drawings, may comprise an engineer's automatic brake valve 18, an independent brake valve 19, a distributing valve device 20, a brake pipe 21, and brake cylinders 22, connected by a pipe 23 to the distributing valve device 20.

As described in the above mentioned Patent No. 1,109,715, the brakes on the locomotive and train may be controlled automatically by manipulation of the engineer's brake valve 18 to vary the brake pipe pressure, the locomotive brakes being controlled by the operation of the distributing valve device 20, or the locomotive brakes may be operated independently by manipulation of the independent brake valve 19.

When an independent application of the brakes on the locomotive is made, the independent brake valve 19 is turned to a position for supplying fluid from the main reservoir 24 through pipe 25, the pressure being reduced by a reducing valve 26, and through pipe 27 to the application piston of the distributing valve 20, as described in Patent No. 1,109,715. The application piston is then operated to shift a valve for supplying fluid admitted from the main reservoir through pipe 28 to the distributing valve 20 through pipe 23 to the locomotive brake cylinders 22.

It has heretofore been proposed to connect the locomotive brake cylinder pipe 23 with a train pipe connected up throughout the train, so that the brakes on the cars of the train may be controlled by straight air as well as automatically, and according to one form of my invention, advantage is taken of this straight air pipe, the same being utilized as the controlling pipe 14 for the piston 11.

Since it may be desired to effect a straight air application of the brakes without shifting the lever 10 to load position, the piston 11 is arranged so as to move only when the pressure supplied to pipe 14 exceeds the maximum pressure employed in making straight air applications of the brakes.

For this purpose, the spring 16 is adjusted, in connection with the reduced area of piston 11, which is exposed when seated to the pressure in pipe 14, so that it requires a pressure in excess of the maximum straight air pressure to move the piston.

On the locomotive, a by-pass pipe 28, containing a cut-out cock 29, is provided around the reducing valve 26, so that when the cut-out cock 29 is opened, fluid at full main reservoir pressure may be supplied to the independent brake valve 19.

In operation, when it is desired to set the empty and load brake apparatus on the cars of the train to loaded position, the cock 29 is opened, as well as cock 30 in the branch pipe connecting the brake cylinder pipe 23 with the straight air pipe 14, and the independent brake valve 19 is turned to straight air application position. Fluid at full main reservoir pressure is then supplied to the application piston of the distributing valve device 20, which is thereupon operated to deliver air at main reservoir pressure to pipe 23 and thence to the straight air pipe 14. The pressure of fluid thus supplied to the straight air pipe is sufficient to lift piston 11 from seat 17 and since the full area of piston 11 is then exposed, the piston 11 will be quickly shifted to the right, operating lever 10 so as to pull out the stem 9 and open valve 6.

Fluid under pressure is thereupon vented from piston chamber 2 to the atmospheric exhaust port 8 and the piston 3 is shifted to the position for adjusting the load brake apparatus to the loaded position.

As shown and described in my prior Patent No. 1,131,967, the piston 3 is normally subject on the valve chamber side to brake pipe pressure and on the opposite side to the pressure of springs 31 and 32, so that in the loaded position, with the atmospheric port 8 open to the spring side of piston 3, said piston will be maintained in the load position until the brake pipe pressure leaks down to a predetermined low degree.

It will thus be seen that after manipulating the independent brake valve 19 to adjust the load brake devices to loaded position, the brake valve may be turned to release position, in which fluid is released from pipe 14 and the pistons 11 on the cars will be returned to normal position, since the pistons 3 will remain in the loaded position as above described.

In this operation, fluid under pressure will, of course, be supplied to the locomotive brake cylinders, but this will do no harm, this pressure being released, when the independent brake valve is moved to release position.

After setting the load brake apparatus on the cars to loaded position, the cock 29 may be closed, so as to permit the usual manipulation of the independent brake valve for effecting straight air applications of the brakes.

In order to prevent possible leakage past the seat 17 from building up pressure on the full area of piston 11 and thus causing the slow movement of the piston to its outer position, a groove 33 may be provided around the piston 11, so that in normal seated position, any leakage past the seat 17 will escape through the groove 33 to exhaust port 34.

It may also be desired to provide means for automatically shifting the load brake apparatus to empty position from the locomotive and for this purpose, a second device similar to the load setting piston may be provided, comprising a piston 35 having a chamber 36 at one side containing a spring 37 and a chamber 38 at the opposite side connected to a pipe 39, the piston 35 having a stem 40 provided with a forked end for engaging an extension of the lever 10.

While a separate train pipe may be provided for supplying and releasing fluid to and from the piston 35, on cars having a train pipe for supplying fluid for operating dumping doors or the like, this train pipe may be utilized, so that when fluid is supplied for opening the dumping doors, it will also be supplied to the piston 35 on each car, so as to effect the movement of the piston and thereby cause the lever 10 to be shifted to the empty position, the stem 9 being thus operated to close valve 6 and through the consequent equalization of fluid pressures on piston 3, said piston will be returned to the empty position.

Having now described my invention, what I claim as new and desire to secure by Letters Patent, is:

1. The combination with an empty and load brake apparatus on a car, of means on the locomotive for adjusting said empty and load brake apparatus independently of the load on the car.

2. The combination with an empty and load brake apparatus on a car, of fluid pressure controlled means for adjusting said apparatus for load braking and means on the locomotive for controlling the fluid pressure for operating said adjusting means.

3. The combination with an empty and load brake apparatus on a car, of a fluid operated piston device for adjusting said apparatus for load braking, a fluid operated piston for adjusting said apparatus for empty car braking, and means on the locomotive for varying the fluid pressure on said piston devices.

4. The combination with an empty and load brake apparatus having a manually operated lever for shifting said apparatus to empty and to load braking positions, of a piston device for shifting said lever to the load braking position and a manually operated valve on the locomotive for varying the fluid pressure on said piston device.

5. In a fluid pressure brake, the combination with a locomotive brake equipment having means for effecting a straight air application of the brakes, of an empty and load brake apparatus on the car having fluid operated means for adjusting said apparatus for load braking and a straight air brake pipe for varying the fluid pressure on said means.

6. In a fluid pressure brake, the combination with an empty and load brake apparatus and means operated by fluid under pressure for adjusting said apparatus for load braking, of a pipe through which fluid is supplied to effect a straight air application of the brakes and through which the fluid pressure is varied on said adjusting means.

7. In a fluid pressure brake, the combination with a pipe through which fluid is supplied for effecting a straight air application of the brakes, of an empty and load brake apparatus and a piston device operated upon an increase in pressure in said pipe to a predetermined degree for adjusting said apparatus for load braking.

8. In a fluid pressure brake, the combination with a pipe through which fluid is supplied for effecting a straight air application of the brakes, and a train pipe for controlling the car dumping doors, of an empty and load brake apparatus, a piston device operated by fluid under pressure in the straight air brake pipe for adjusting said apparatus for load braking, and a piston device operated upon supplying fluid to the pipe controlling the dumping doors for adjusting said apparatus for empty car braking.

In testimony whereof I have hereunto set my hand.

WALTER V. TURNER.